United States Patent [19]

Jones et al.

[11] 4,335,807
[45] Jun. 22, 1982

[54] POWER RAIL SUPPORT APPARATUS

[75] Inventors: Earle H. Jones, Issaquah, Wash. and Alleyne C. Howell, Jr., Fairfield, Conn.

[73] Assignee: The Boeing Company, Seattle, Wash.

[21] Appl. No.: 23,520

[22] Filed: Mar. 23, 1979

[51] Int. Cl.³ ............................................. B60M 1/30
[52] U.S. Cl. .................................................. 191/32
[58] Field of Search ................... 191/29 R, 30, 32, 40

[56] References Cited

U.S. PATENT DOCUMENTS

| | | | |
|---|---|---|---|
| 2,912,526 | 11/1959 | Herrmann | 191/23 |
| 3,341,669 | 9/1967 | Martin | 191/32 X |
| 3,894,170 | 7/1975 | Schinzel | 174/99 B |
| 4,022,967 | 5/1977 | Bulanchuk | 191/40 X |
| 4,043,436 | 8/1977 | Segar | 191/32 |

*Primary Examiner*—Richard A. Schacher
*Attorney, Agent, or Firm*—Robert L. Gullette; William C. Anderson

[57] ABSTRACT

A hanger and a keeper secured thereto for simultaneously supporting and retaining multiple electrical power rails in spaced apart parallel coplanar alignment. To construct a multi-phase power distribution system for use with a vehicle equipped with multiple single-phase power collector shoes respectively operable with the power rails, a plurality of hangers are mountable from respective ground support elements along and at a common predetermined height from a predetermined vehicle travel path or guideway. Following positioning of the guide rails on the hangers, the keepers are secured thereto so as to simultaneously retain the power rails on their hangers in operative relation with the power collector shoes. With this construction, multiple power rails may be provided in operative relation with the power collector shoes without individual adjustment.

17 Claims, 8 Drawing Figures

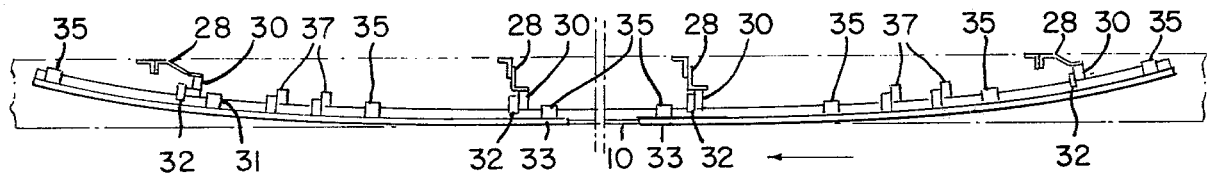
FIG. 1
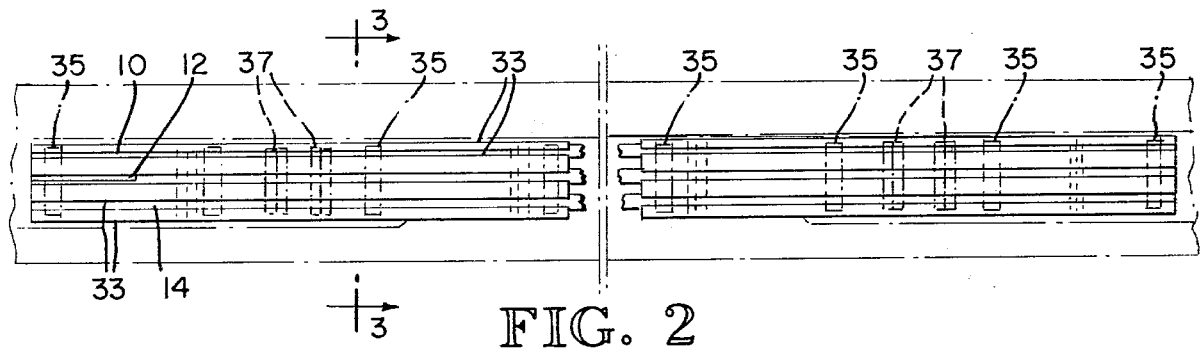
FIG. 2
FIG. 3
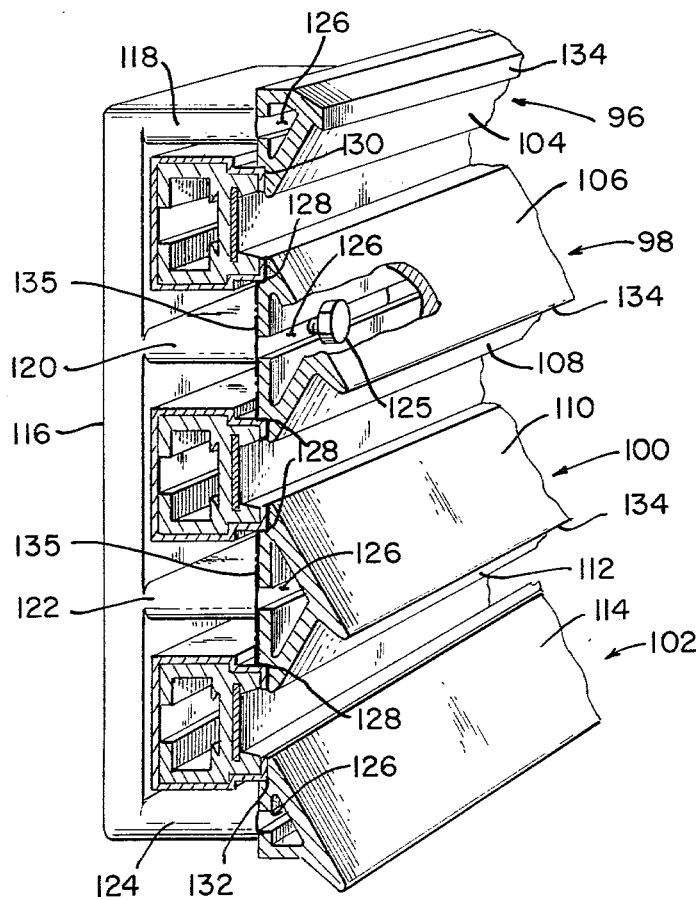
FIG. 4
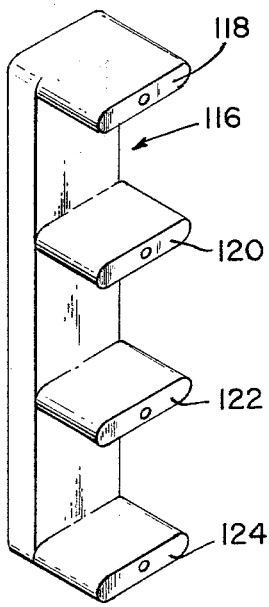

POWER RAIL SUPPORT APPARATUS

BACKGROUND OF THE INVENTION

This invention relates to apparatus for supporting multiple electrical power rails. The apparatus is illustrated and described herein with reference to a multi-phase electrical power distribution system for use with an electrically powered vehicle adapted to travel along a predetermined travel path, the vehicle having a multi-phase power collector assembly made up of multiple single-phase power collector shoes respectfully operable with the power rails, although the invention may be utilized in other applications and environments.

Automated transportation systems (sometimes referred to as "people mover" systems) commonly employ a self-propelled rubber tired vehicle which travels along a predetermined travel path or guideway. The vehicle is powered electrically, generally by three-phase electrical current, and receives current from multiple power rails which are positioned adjacent the travel path. The vehicle includes a power collector assembly made up of multiple single-phase power collector shoes which are respectively operable with the power rails to receive three-phase electrical power present on the power rails for operating an electrical drive motor carried by the vehicle. The power collector shoes generally are supported by individual movable arms which are urged toward and maintained in contact with the respectively associated power rail during movement of the vehicle along the travel path. The power rails typically are supported at intervals along the travel path in spaced apart parallel vertical coplanar alignment, although in some systems they may be disposed in a horizontal coplanar alignment.

Each power rail support for systems of this type is made up of a ground support member which is embedded in the ground or the guideway adjacent the vehicle travel path and individual rail supports which are mounted by the support member for individually supporting the power rails in appropriate alignment. Since it is essential that the power rails be aligned properly with respect to the vehicle power collector shoes, the power rails must be aligned individually by adjusting the positions of the rail supports with respect to the ground supports and with respect to each other. As a consequence, alignment of the power rails must be checked and maintained at each support location, often requiring large expenditures of time and labor in connection with installation and maintenance of correct power rail alignment during operation of the power distribution system. Furthermore, since the power rails are supported independently at each support location, they often tend to become misaligned with respect to one another and therefore require continued maintenance and checking throughout the operational life of the system. For these and other reasons, power rail support apparatus has, until this invention, been uneconomical to install and operate, especially on a large scale associated with a fully operational rapid transit system.

SUMMARY OF THE INVENTION

This invention overcomes or substantially mitigates these and other problems associated with power rail support apparatus by providing power rail support apparatus made up of a elongated hanger mountable by an appropriate ground support and an elongated keeper cooperable with the hanger for simultaneously securing multiple electrical power rails in spaced apart parallel coplanar alignment. For use in a multi-phase power distribution system, this apparatus may be used with a plurality of ground support elements at spaced apart locations along and at a common predetermined height from the travel path. A plurality of these hangers are mounted from the ground support elements, respectively, and multiple electrical power rails are positioned on the mounted hangers in spaced apart parallel coplanar alignment. The keepers are then secured to the mounted hangers after positioning of the power rails thereon to provide simultaneous retention of the power rails in correct alignment. It will be recognized, however, that the invention could be used in a single phase or a direct current or other power distribution system made up of power carrying rails and a ground rail and, therefore, the multi-phase system is illustrative and not limiting.

Thus, it is possible, by embedding or positioning the ground support elements at a predetermined height from the travel path and by simultaneously supporting and retaining the power rails in correct alignment with respect to the predetermined height, to obtain highly accurate alignment of the power rails with respect to one another and with respect to the vehicle power collector shoes. Furthermore, the power rails may be installed simultaneously without being individually positioned and secured. The power rail support apparatus of this invention therefore provides unparalleled economy, accuracy, and reliability. While preferably the power rail support apparatus is used for supporting multiple electrical power rails in coplanar vertical alignment, it may be used to similarly support the power rails in other alignments.

These and other features, objects and advantages of the present invention will become apparent from the detailed description and claims to follow, taken in conjunction with the accompanying drawings in which like parts bear like reference numerals.

BRIEF DESCRIPTION OF THE DRAWINGS

FIG. 1 is a top plan view of a section of a multi-phase power distribution system equipped with the power rail support apparatus of this invention;

FIG. 2 is a side elevational view of the FIG. 1 system;

FIG. 3 is a section taken along the line 3—3 in FIG. 2;

FIG. 4 is a perspective view of a mounting member for mounting the guide member assembly of the FIG. 1 system;

DETAILED DESCRIPTION OF THE DRAWINGS

Figure 8:
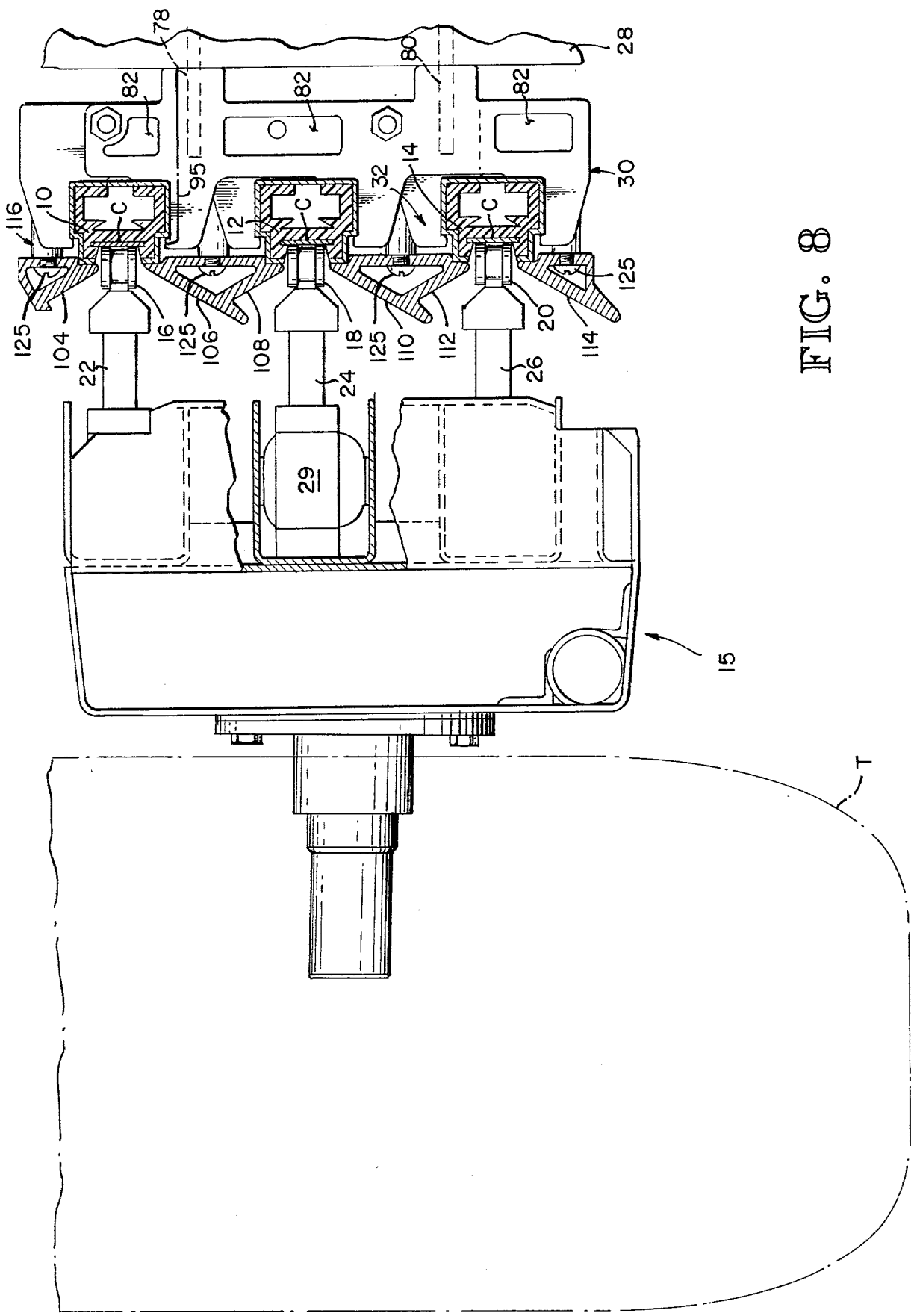
FIG. 8 is a transverse sectional view generally similar to FIG. 3, depicting a vehicle multi-phase power collector assembly operative with the FIG. 1 system.

Referring to FIGS. 1, 2 and 8 of the drawings, the illustrated power rail support apparatus of this invention is particularly suited for use in a multi-phase electrical power distribution system including multiple electrical power rails for providing multi-phase electrical power to an electrically powered rubber tired vehicle adapted to travel along a predetermined travel path. In the example, the system provides three-phase electrical power which is carried by three power rails 10, 12 and 14, although the support apparatus could be used with other multi-phase systems. The vehicle is equipped with a three-phase power collector assembly (generally referenced by numeral 15 in FIG. 8) made up of three single-phase power collector shoes 16, 18 and 20 (FIG. 8) which are respectively operable with the power rails 10, 12 and 14 to receive power therefrom as the vehicle moves along the travel path. In the example illustrated in FIG. 8, the power collector shoes are mounted by individual rotatable support arms 22, 24 and 26 which are positionable at the parallel extended rail contact positions illustrated. These arms are supported individually by ball joints 29 (only one shown) for rotation about a common vertical axis and are urged toward their rail contact positions by extension springs not shown. Assembly 15 is mounted in co-axial alignment with the left front tire T of the vehicle although it could be mounted at other locations.

Referring to FIGS. 1 and 2, the power rail support apparatus of this system includes a plurality of ground support elements 28 embedded in the guideway or earth adjacent the travel path (depicted by the arrow) at spaced apart locations along and at a common predetermined height from the travel path. A plurality of hangers 30 are mounted from the ground support elements, respectively, and each hanger is adapted to simultaneously support the three power rails 10, 12, 14 in spaced apart coplanar vertical alignment. The power rails are positioned on the mounted hangers in this alignment and a plurality of keepers 32 are secured to the mounted hangers after positioning of the power rails thereon. Each keeper is adapted to simultaneously retain the multiple power rails in the illustrated position when secured to a hanger. Additional unsupported hanger/keeper combinations may be secured to rails 10, 12, 14 between elements 28, for example at 37, to positively retain the rails in parallel alignment against transverse shifting with respect to one another due to electromotive forces. The number and location of the additional hanger/keeper combinations will depend upon fault current levels and other factors.

The apparatus illustrated in FIGS. 1 and 2 additionally may provide guidance of the power collector shoes with respect to the power rails at selected locations, such as intersections, at which the collector shoes must be moved toward and engaged with the power rails. To this end, the apparatus may include convergent guide surfaces (generally referenced by numeral 33) which may be secured to the guide rails at intervals by mounts 35, to be described presently.

Figure 5:
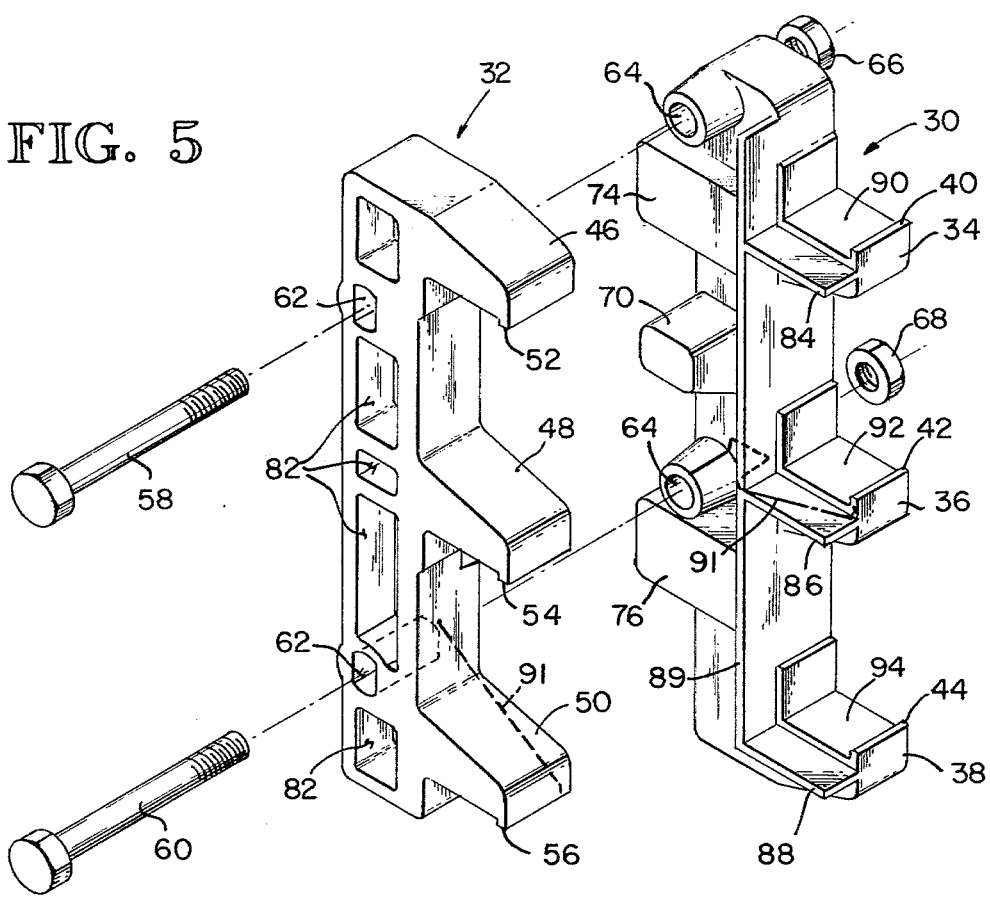
FIG. 5 is a perspective view of a hanger and keeper of the FIG. 1 system.
Figure 6:
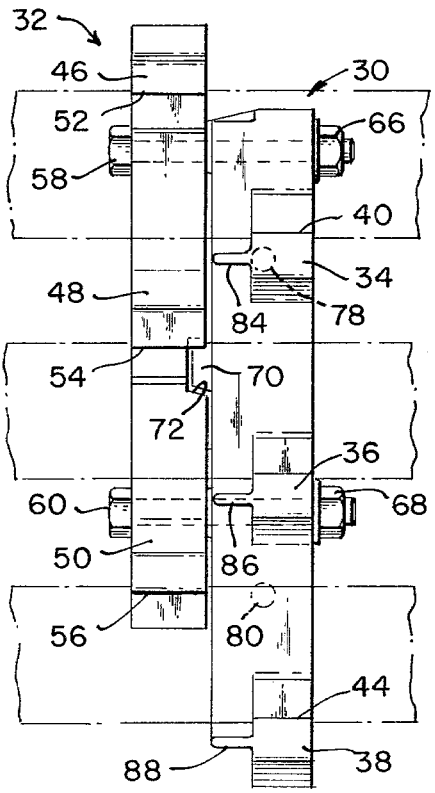
FIG. 6 is a front elevational view of the FIG. 5 hanger and keeper secured together and supporting three electrical power rails.
Figure 7:
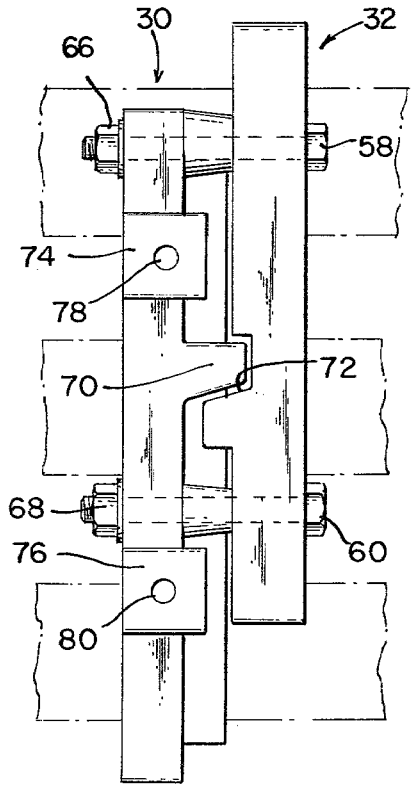
FIG. 7 is a rear elevational view corresponding to FIG. 6.

Referring now in particular to FIGS. 5-8, one hanger 30 and one keeper 32 are illustrated in further detail. The hanger includes three spaced apart load bearing portions 34, 36 and 38 which project transversely from the hanger in parallel relation and respectively terminate in upstanding shoulders 40, 42 and 44. Three power rails are restable upon the load bearing portions and with shoulders 40, 42 and 44 overlapping the outer lower edges of the power rails adjacent the lower edges of the conductors C embedded therein, as shown (FIG. 8). The keeper likewise includes three spaced apart retaining portions 46, 48 and 50 which project transversely from the keeper in parallel relation and respectively terminate in oppositely projecting shoulders 52, 54 and 56 adapted to overlap the outer upper edge portions of the power rails adjacent the upper edges of conductors C. The hanger and keeper are secured together in side-by-side parallel alignment with each retaining portion so opposed to a load bearing portion that a power rail may be supported and retained therebetween, with the load bearing shoulder and the retaining portion shoulder together retaining the associated power rail against transverse shifting. The power rails, however, are shiftable longitudinally, to permit thermal elongation. In the example, the hanger and keeper are securable together by upper and lower bolts 58 and 60 which extend through transverse openings 62 and 64 within the bodies of the keeper and hanger, respectively, for engagement with nuts 66 and 68, although they could be secured together by other means. To align the hanger and keeper with respect to one another, the hanger includes an index projection 70 and the keeper includes a recess 72 (FIG. 6) at a location offset with respect to the midpoints of both members. The projection 70 has an outline which registers with recess 72 and is insertable therein when the hanger and keeper are secured together, as shown (FIGS. 6 and 7). By virtue of projection 70 and recess 72, the hanger and keeper may be assembled with the holes 62, 64 in correct alignment to enable rapid and positive positioning of the hanger and the keeper. Projection 70 also serves to transmit shear loads between the hanger and keeper 70 when engaged with recess 72. Additionally, the hanger includes upper and lower reinforced portions 74, 76 which respectively include threaded female inserts 78, 80 (FIG. 7) embedded in the rear faces thereof for receiving threaded connectors from the ground support elements for mounting the hanger thereon. To lighten the hanger and keeper, appropriate lightening recesses 82 may be provided in the bodies of each, as illustrated (FIGS. 5 and 8).

Still referring to FIG. 5, the hanger also includes lateral plate-like projections 84, 86 and 88 which respectively extend laterally from the load bearing portions 40, 42 and 44 toward the keeper. A generally smiliar projection 89 extends from the body of the hanger along its length in perpendicular relation to projections 84, 86 and 88. These projections are of appropriate lengths to establish creepage paths of sufficient distances to prevent electrical surface conduction which might lead to a short circuit or fault between adjacent power rails due to accumulation of moisture, contaminants or other conductive material. Each rail-to-rail creepage path preferably exceeds about 3.5 inches in length. An exemplary rail-to-rail creepage path between rail 12 and rail 14 is referenced by the line designated by numeral 91 in FIG. 5. To prevent a ground fault between one power rail and a ground support element, the load bearing portions contain L-shaped raised undersurfaces 90, 92 and 94 which serve to space the rear and lower surfaces of the power rails from the ground support element. In the example of FIG. 8, the shortest rail-to-ground creepage path, referenced by numeral 95, is between rail 10 and element 28 and preferably exceeds about 3.0 inches in length to prevent a rail-to-ground fault along path 95.

In the example, the hanger and keeper are composed of an appropriate electrically non-conductive material which preferably has a shear strength of at least about 8,000 psi at 73 degrees Fahrenheit, a tensile strength of at least about 14,000 psi at 73 degrees Fahrenheit, is ultraviolet stabilized, is arc and track resistant, complies with UL94-VO flame resistant standards, is impact resistant, and is ethylene glycol resistant. One suitable material is reinforced glass-filled polyester "Havamold" HM9300-30.

Referring now to FIGS. 3, 4, and 8, four elongated hollow core guide members 96, 98, 100 and 102 are respectively positionable adjacent opposite sides of the power rails in parallel relation therewith to form ramp surfaces 104, 106, 108, 110, 112 and 114 which converge in pairs towards the power rails for guiding a power collector shoe theretoward. A single mounting member 116 illustrated in FIG. 4 secures the guide members to the power rail as shown (FIGS. 3 and 8). This mounting member is positionable behind the power rails when supported and retained in spaced apart paralled coplanar alignment by the hanger and keeper described previously and includes four mounting portions 118, 120, 122 and 124 which project between the power rails for respective load bearing connection to the guide members. In the illustrated example, the guide members are secured to the mounting portions by bolts 125 which extend through appropriate slots 126 formed in the interior of the guide members and are threaded to the ends of the project mounting portions, although the guide members could be secured to the guide members by other means, if desired.

Three types of guide members are illustrated in FIGS. 3 and 8: an intermediate guide member (see guide members referenced by numerals 98 and 100), an upper guide member (see guide member referenced by numeral 96) and a lower guide member (see guide member referenced by numeral 102). The intermediate guide members include shoulders 128 which extend along the edges thereof and which register with the outer corners of the power rails, as shown. The upper and lower guide members include only one such shoulder each, referenced by numerals 130 and 132. The shoulders 128, 130 and 132 accurately position and maintain the guide members in operative relation adjacent or bridging between adjacent power rails. Guide members 96, 98 and 100 also include lips 134 which over-hang underlying ramp surfaces 104, 108 and 112 to form drip surface shields with respect thereto for causing moisture collected above the lip to separate from the guide member in order to prevent the moisture from traveling down ramp surfaces 104, 108 and 112 toward the associated power rails. The guide members also form rail-to-rail creepage paths, referenced by numerals 135 in FIG. 3, which preferably exceed about 2.6 inches in length to prevent rail-to-rail faults along paths 135.

In the example, the guide members are composed of non-conductive material encased by an outer layer of wear resistant fabric. The non-conductive material preferably has a shear strength of at least about 1,100 psi at 73 degrees Fahrenheit, structural strength of at least about 22,000 psi at 73 degrees Fahrenheit, as ultraviolet stabilized, is arc and track resistant, complies with UL94-VO flame resistant standards, is impact resistant, and is ethylene glycol resistant. One suitable material is fiber reinforced glass-filled polyester diamond resin DION-FR-8300. The outer layer preferably is composed of nexis polyester fiber surfacing fabric.

Although one preferred embodiment of the invention has been illustrated and described herein, variations will become apparent to one of ordinary skill in the art. Accordingly, the invention is not to be limited to the specific embodiment illustrated and described herein and the true scope and spirit of the invention are to be determined by reference to the appended claims.

The embodiments of the invention in which an exclusive property or privilege is claimed are defined as follows:

1. Apparatus for supporting multiple electrical power rails in spaced apart parallel coplanar alignment, comprising: an elongated hanger mountable by ground support means and including multiple spaced apart parallel load bearing portions projecting transversely from said hanger for respectively supporting multiple power rails in spaced apart parallel coplanar alignment; an elongated keeper securable to said hanger and including multiple spaced apart parallel retaining portions projecting transversely from said keeper for respectively retaining multiple power rails in spaced apart coplanar alignment when supported by said load bearing portions; means for securing said keeper to said hanger to support and retain multiple power rails simultaneously; multiple elongated guide members respectively positionable adjacent opposite sides of the power rails in parallel relation therewith to form ramp surfaces converging toward each power rail; and mounting means for mounting said guide members to the power rails;

wherein at least one guide member is positionable between two adjacent power rails and includes means forming two ramp surfaces oppositely inclined toward the edges of two adjacent power rails, and at least two guide members are respectively positionable adjacent only one power rail and include means forming one ramp surface oppositely inclined toward a ramp surface formed by said one guide member; and wherein said mounting means include an elongated mounting member positionable behind the power rails when supported and retained in spaced apart parallel coplanar alignment and including multiple mounting portions projecting between the power rails for respective load bearing connection to said guide members, and means operatively connected to said guide members for respectively securing said guide members to said mounting portions so as to clamp the power rails therebetween.

2. The apparatus of claim 1, wherein each said load bearing portion terminates in a shoulder adapted to overlap an edge portion of the associated power rail adjacent one edge of a conductor embedded therein, and each said retaining portion terminates in a shoulder adapted to overlap an edge portion of the associated power rail adjacent the opposite edge of the conductor; said load bearing shoulder and said retaining portion shoulder together retaining the associated power rail against transverse shifting when said keeper is secured to said hanger.

3. The apparatus of claim 2, wherein said keeper is secured to said hanger in side-by-side parallel relation, and including means forming multiple surfaces respectively connected to said load bearing portions and providing respectively associated creepage paths between said load bearing portions and said keeper of sufficient length to prevent electrical surface conduction between the power rails via said creepage paths.

4. The apparatus of claim 1, wherein the power rails are supported and retained in generally vertical alignment, and wherein the guide members having underlying ramps surfaces inclined downwardly toward the associated power rail each includes over-hanging lip means forming a drip surface for causing moisture collected above the underlying ramp surface to separate from the guide member, whereby travel of such moisture down the underlying ramp surface toward the associated power rail may be prevented.

5. The apparatus of claim 1, wherein each elongated member includes at least one relief surface forming a shoulder adjacent the edge thereof for engagement with the edge of the adjacent power rail.

6. In a power distribution system including multiple electrical power rails for use with an electrically powered vehicle adapted to travel along a predetermined travel path, the vehicle having a power collector assembly made up of multiple power collector shoes respectively operable with the power rails, power rail support apparatus comprising:
   (a) a plurality of ground support elements at spaced apart locations along and at a common predetermined height from the travel path;
   (b) a plurality of hangers mounted from the ground support elements, respectively, each hanger including means for simultaneously supporting multiple power rails in spaced apart parallel coplanar alignment;
   (c) a plurality of keepers secured to the mounted hangers after multiple power rails are positioned thereon in operative relation with said supporting means, each keeper including means for simultaneously retaining multiple power rails in spaced apart coplanar alignment when supported by said supporting means, whereby the power rails may be provided in operative relation with the power collector shoes without individual adjustment; and
   (d) multiple elongated guide members secured adjacent opposite sides of the power rails in parallel relation therewith to form ramp surfaces converging toward each power rail for guiding a power collector shoe theretoward, at least one guide member being positioned between two adjacent power rails and including means forming two ramp surfaces oppositely inclined toward the edges of two adjacent power rails, and at least two guide members being respectively positioned adjacent only one power rail and including means forming one ramp surface oppositely inclined toward a ramp surface formed by said one guide member.

7. The system of claim 6, including at least one additional such keeper secured to an unsupported such hanger at a location between two ground support elements.

8. The system of claims 6, or 7 wherein the power rails are positioned in generally vertical alignment.

9. The system of claim 6, further comprising means extending between said power rails for mounting said guide members to said power rails.

10. The system of claim 9, wherein said guide member mounting means comprises an elongated mounting member positionable behind the power rails when supported and retained in spaced apart parallel coplanar alignment and including multiple mounting portions projecting between the power rails for respective load bearing connection to said guide members, and means operatively connected to said guide members for respectively securing said guide members to said mounting portions so as to clamp the power rails therebetween.

11. Apparatus for guiding multiple power collector shoes toward multiple power rails mounted in spaced apart parallel coplanar alignment, said apparatus comprising:
   multiple elongated guide members respectively positionable adjacent opposite sides of the power rails in parallel relation therewith to form ramp surfaces converging toward each power rail, and means for mounting said guide members to said power rails;
   at least one said guide member being positionable between two adjacent power rails, and including means forming two ramp surfaces oppositely inclined toward the edges of two adjacent power rails;
   at least two said guide members being respectively positionable adjacent only one power rail, and including means forming one ramp surface oppositely inclined to a ramp surface formed by said one guide member; and
   said mounting means including an elongated mounting member positionable behind the power rails when supported and retained in spaced apart parallel coplanar alignment, and including multiple mounting portions projecting between the power rails for respective load bearing connection to said guide members, and means operatively connectable to said guide members for respectively securing said guide members to said mounting portions so as to clamp the power rails therebetween.

12. The apparatus of claim 11, wherein the power rails are supported and retained in generally vertical alignment, and wherein the guide members having underlying ramp surfaces inclined downwardly toward the associated power rail each includes over-hanging lip means forming a drip surface for causing moisture collected above the underlying ramp surface to separate from the guide member, whereby travel of such moisture down the underlying ramp surface toward the associated power rail may be prevented.

13. The apparatus of claims 11 or 12, wherein each elongated member includes at least one relief surface forming a shoulder adjacent the edge thereof for engagement with one edge of the adjacent power rail.

14. Apparatus for guiding a moving power collection shoe into contact with a power rail, said apparatus comprising:
   an elongated body having a hollow core and a rear wall and including a first shoulder adapted to engage one edge of a first power rail and a second shoulder adapated to engage one edge of a second power rail spaced from and parallel to the first power rail; front ramp means forming a first ramp surface inclined from an outer terminus toward the first power rail and terminating at a first inner terminus adjacent said first shoulder and a second ramp surface oppositely inclined from said outer terminus and terminating at a second inner terminus adjacent said second shoulder; and means extending between said power rails for mounting said body to said power rails with said first and second shoulders respectively engaged with said one edges, said body mounting means including at least one opening extending through said rear wall for connecting with said body.

15. The guide member of claim 14, including lip means adjacent said outer terminus forming a drip surface.

16. The apparatus of claim 14, wherein said body mounting means comprises an elongated mounting member positionable behind the power rails when maintained in spaced apart parallel coplanar alignment and including multiple mounting portions projecting between the power rails for respective load bearing connection to said guide members, and means operatively connected to said guide members for respectively securing said guide members to said mounting portions so as to clamp the power rails therebetween.

17. Power rail support apparatus, comprising: means for maintaining multiple power rails in spaced apart coplanar alignment; multiple elongated guide members secured, respectively, adjacent opposite sides of the power rails in parallel relation therewith to form ramp surfaces converging toward each power rail, at least one guide member being positioned between two adjacent power rails and including means forming two ramp surfaces oppositely inclined toward the edges of two adjacent power rails, at least two guide members being respectively positioned adjacent only one power rail and including means forming one ramp surface oppositely inclined toward a ramp surface formed by said one guide member; and means extending between said power rails for mounting said guide members to said power rails, said guide member mounting means comprising an elongated mounting member positionable behind the power rails when maintained in spaced apart parallel coplanar alignment and including multiple mounting portions projecting between the power rails for respective load bearing connection to said guide members, and means operatively connected to said guide members for respectively securing said guide members to said mounting portions so as to clamp the power rails therebetween.

* * * * *